United States Patent
Sakai

(10) Patent No.: US 12,190,699 B2
(45) Date of Patent: Jan. 7, 2025

(54) CALCULATION DEVICE, CALCULATION SYSTEM, CALCULATION METHOD, AND STORAGE MEDIUM

(71) Applicant: NEC Corporation, Tokyo (JP)

(72) Inventor: Hirotoshi Sakai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1 day.

(21) Appl. No.: 18/021,699

(22) PCT Filed: Sep. 27, 2021

(86) PCT No.: PCT/JP2021/035226
§ 371 (c)(1),
(2) Date: Feb. 16, 2023

(87) PCT Pub. No.: WO2022/065462
PCT Pub. Date: Mar. 31, 2022

(65) Prior Publication Data
US 2023/0360510 A1    Nov. 9, 2023

(30) Foreign Application Priority Data
Sep. 28, 2020   (JP) .................................. 2020-161647

(51) Int. Cl.
G08B 21/10   (2006.01)
G08B 21/02   (2006.01)
H04W 4/90   (2018.01)

(52) U.S. Cl.
CPC ............. *G08B 21/10* (2013.01); *G08B 21/02* (2013.01); *H04W 4/90* (2018.02)

(58) Field of Classification Search
CPC .......... G08B 21/10; G08B 21/02; H04W 4/90
See application file for complete search history.

(56) References Cited

U.S. PATENT DOCUMENTS

| 10,389,890 B2 * | 8/2019 | Tateyama ............. H04N 1/4433 |
| 10,599,174 B2 * | 3/2020 | Baker ................. H05B 47/1965 |
| 11,037,260 B2 * | 6/2021 | Johnson ................. G06Q 10/06 |
| 11,368,814 B2 * | 6/2022 | Johnson ................. H04W 12/06 |
| 11,553,323 B2 * | 1/2023 | Makinoshima ......... H04W 4/90 |

(Continued)

FOREIGN PATENT DOCUMENTS

| JP | H10-334146 A | 12/1998 |
| JP | 2014-183419 A | 9/2014 |

(Continued)

OTHER PUBLICATIONS

International Search Report for PCT Application No. PCT/JP2021/035226, mailed on Dec. 14, 2021.

(Continued)

*Primary Examiner* — John A Tweel, Jr.

(57) ABSTRACT

In order to more accurately ascertain the number of evacuees, a calculation device according to the present invention comprises: a communication means which transmits a response request to terminals in an evacuation shelter and which receives, from the terminals that have responded to the response request, signals in accordance with operations by users of the terminals; and a calculation means which calculates, as the number of evacuees in the evacuation shelter, the number of the terminals which have transmitted the signals.

10 Claims, 7 Drawing Sheets

(56) References Cited

U.S. PATENT DOCUMENTS 11,854,441 B2 * 12/2023 Kohata ................ G06Q 50/265
2005/0200453 A1 * 9/2005 Turner .................. G07C 9/257
340/10.41

FOREIGN PATENT DOCUMENTS

| JP | 2019-079369 A | 5/2019 |
| JP | 2019-197294 A | 11/2019 |
| JP | 2020-135219 A | 8/2020 |
| JP | 2020-140296 A | 9/2020 |

OTHER PUBLICATIONS

English translation of Written opinion for PCT Application No. PCT/JP2021/035226, mailed on Dec. 14, 2021.

* cited by examiner

CALCULATION DEVICE, CALCULATION SYSTEM, CALCULATION METHOD, AND STORAGE MEDIUM

This application is a National Stage Entry of PCT/JP2021/035226 filed on Sep. 27, 2021, which claims priority from Japanese Patent Application 2020-161647 filed on Sep. 28, 2020, the contents of all of which are incorporated herein by reference, in their entirety.

TECHNICAL FIELD

The present invention relates to a calculation device and the like that enable more accurate calculation of the number of evacuees in an evacuation shelter.

BACKGROUND ART

When a disaster such as an earthquake occurs, a local government starts running an evacuation shelter to which disaster victims evacuate. The local government needs to recognize the accurate number of evacuees in the evacuation shelter in order to provide the evacuation shelter with a quantity of supplies sufficient for the number of evacuees, for example.

For example, PTL 1 discloses that, when a position associated to position information relating to a terminal is within an area of an evacuation shelter, a user of the terminal is regarded as an evacuee in the evacuation shelter.

CITATION LIST

Patent Literature

[PTL 1] Japanese Unexamined Patent Application Publication No. 2014-183419

SUMMARY OF INVENTION

Technical Problem

However, in most cases, aside from the evacuees, officials of the local government, volunteer staffs, and the like are also present in the evacuation shelter. Thus, with the technique disclosed in PTL 1, not only terminals of the evacuees but also terminals of the officials of the local government and the volunteer staffs are regarded as the terminals of the evacuees, which makes it difficult for the local government to recognize the accurate number of evacuees.

The present invention has been made in view of the above-mentioned problem, and an object of the present invention is to recognize the number of evacuees more accurately.

Solution to Problem

A calculation device according to the present invention includes:
  a communication means for transmitting a response request to a terminal in an evacuation shelter and receiving, from the terminal responding to the response request, a signal according to an operation by a user of the terminal; and
  a calculation means for calculating, as the number of evacuees in the evacuation shelter, the number of the terminals transmitting the signal.

A calculation method according to the present invention includes:
  transmitting a response request to a terminal in an evacuation shelter;
  receiving, from the terminal responding to the response request, a signal according to an operation by a user of the terminal; and
  calculating, as the number of evacuees in the evacuation shelter, the number of the terminals transmitting the signal.

A storage medium according to the present invention stores a program causing an information processing device to execute:
  processing of transmitting a response request to a terminal in an evacuation shelter;
  processing of receiving, from the terminal responding to the response request, a signal according to an operation by a user of the terminal; and
  processing of calculating, as the number of evacuees in the evacuation shelter, the number of the terminals transmitting the signal.

Advantageous Effects of Invention

According to the present invention, the number of evacuees in an evacuation shelter is able to be calculated more accurately.

EXAMPLE EMBODIMENT

First Example Embodiment

Figure 1:
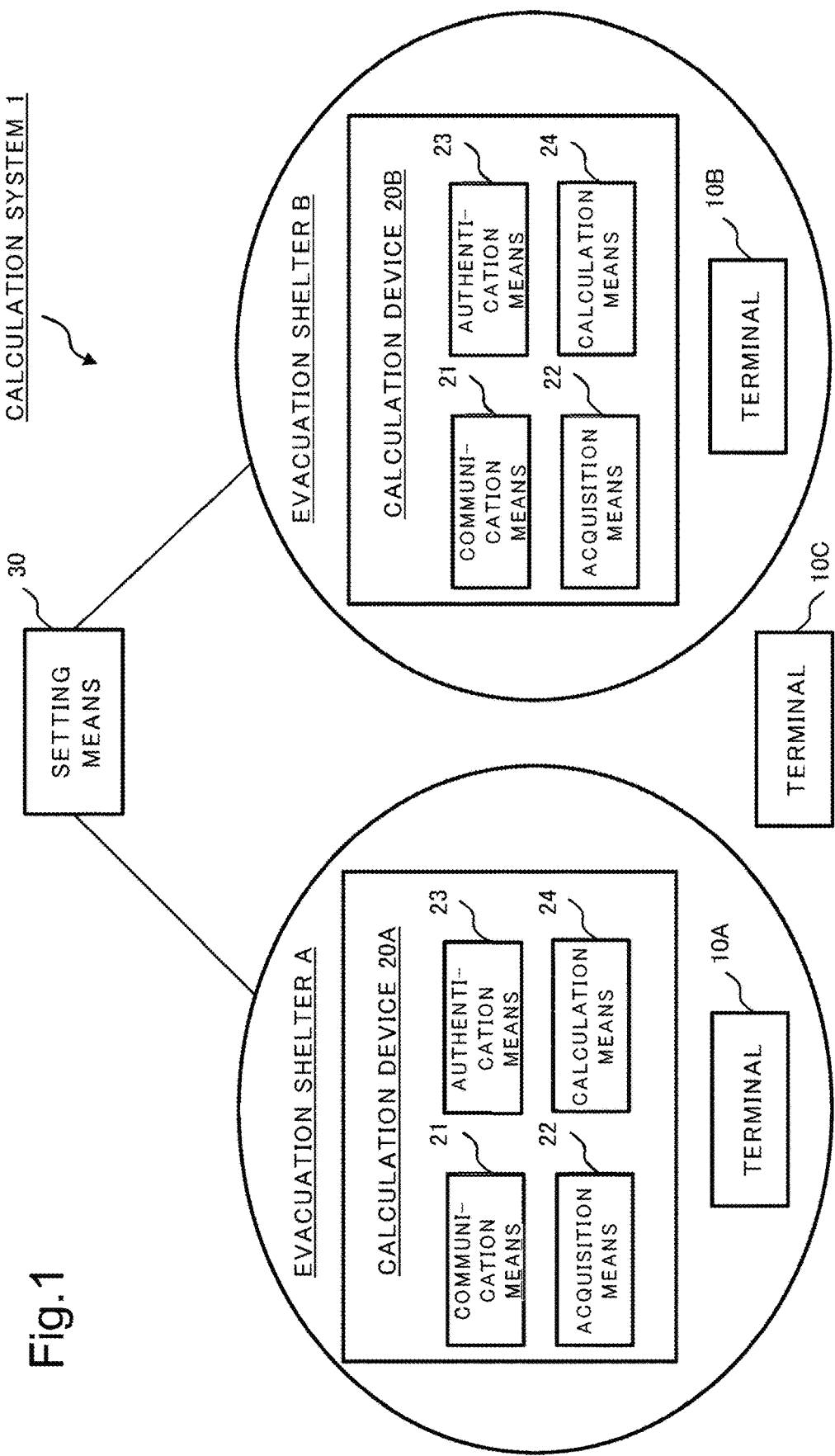
FIG. 1 is a block diagram illustrating a configuration example of a calculation system according to a first example embodiment of the present invention.
Figure 2:
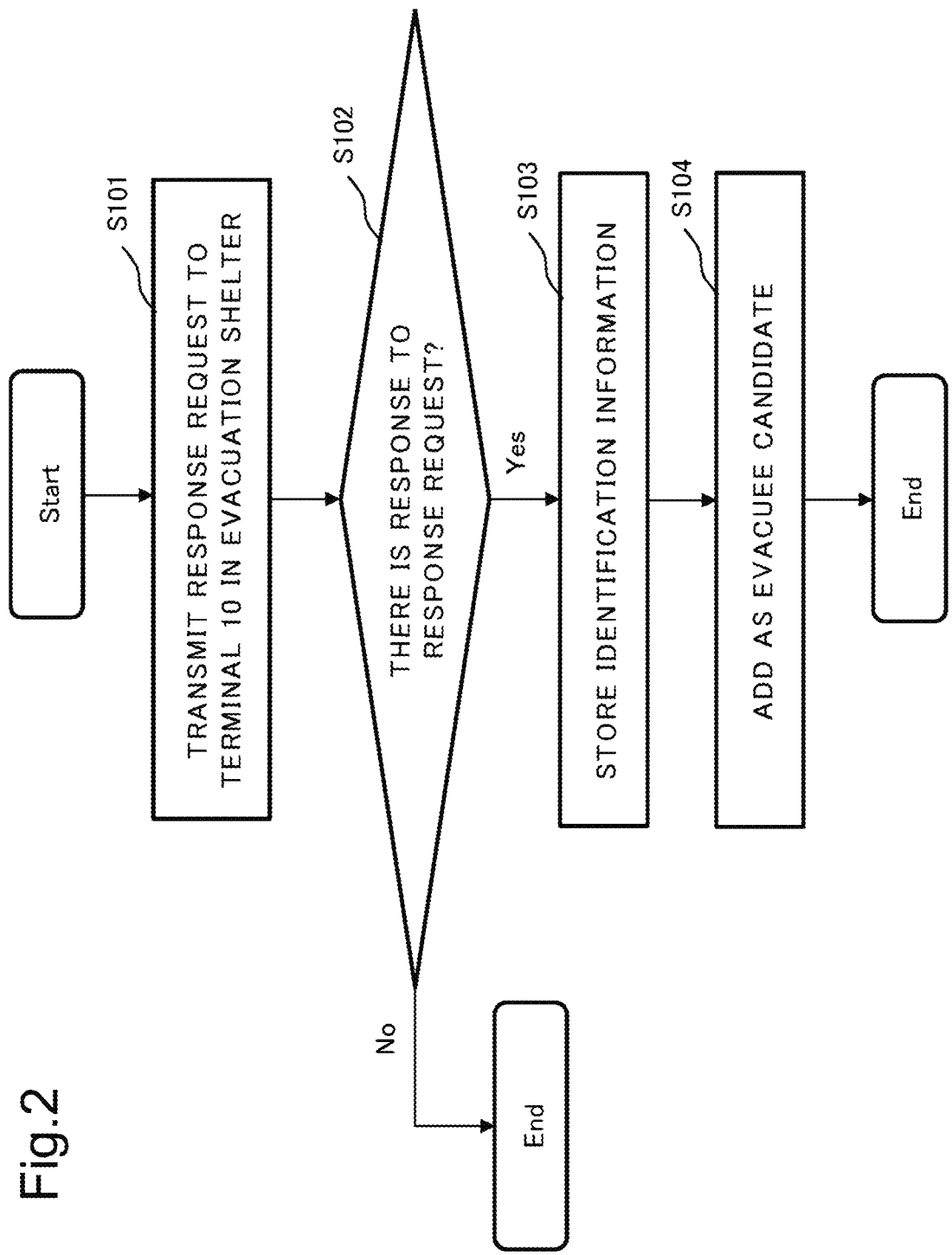
FIG. 2 is a flowchart illustrating an operation example of the calculation system according to the first example embodiment of the present invention.
Figure 3:
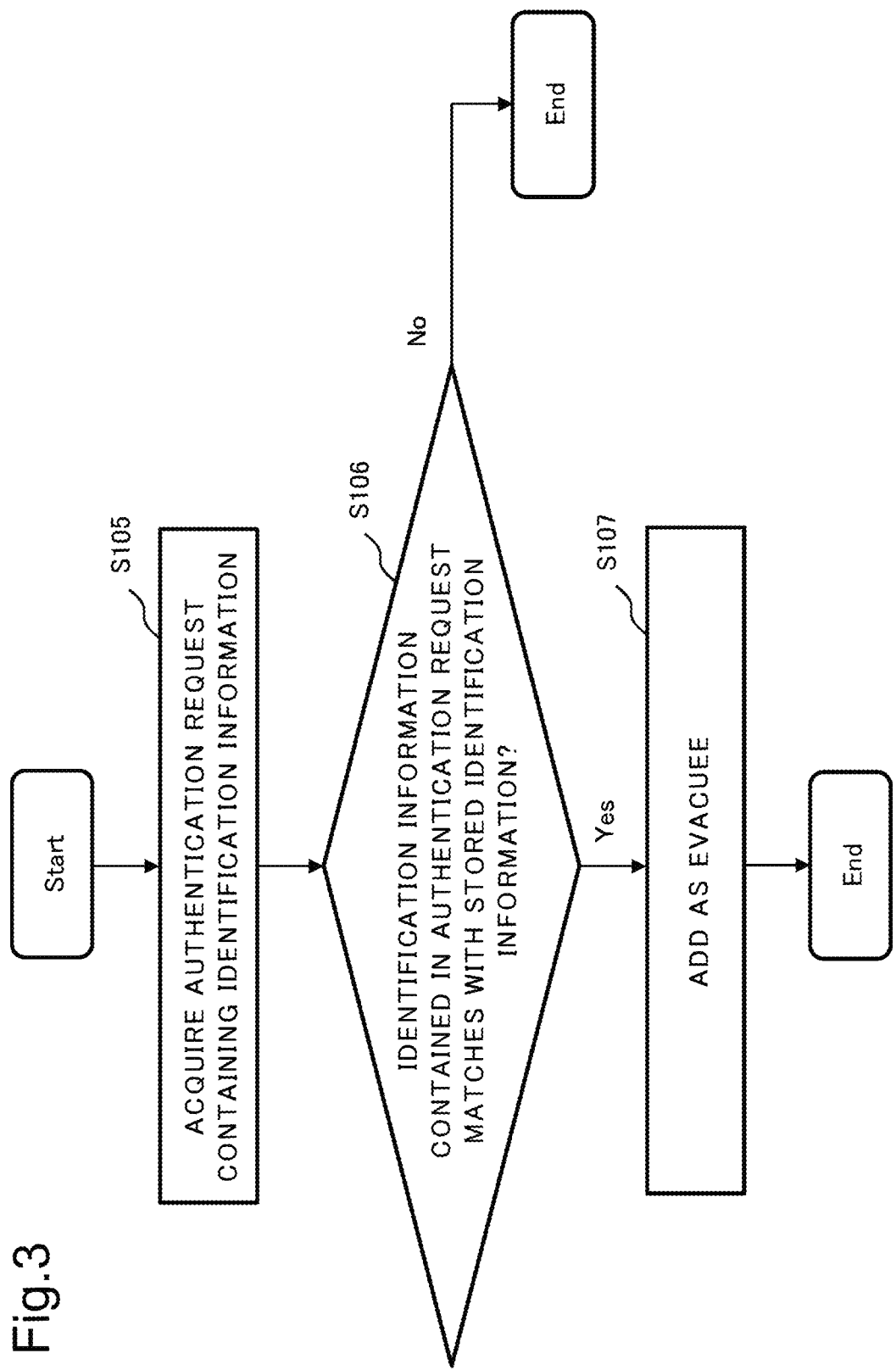
FIG. 3 is a flowchart illustrating an operation example of the calculation system according to the first example embodiment of the present invention.
Figure 4:
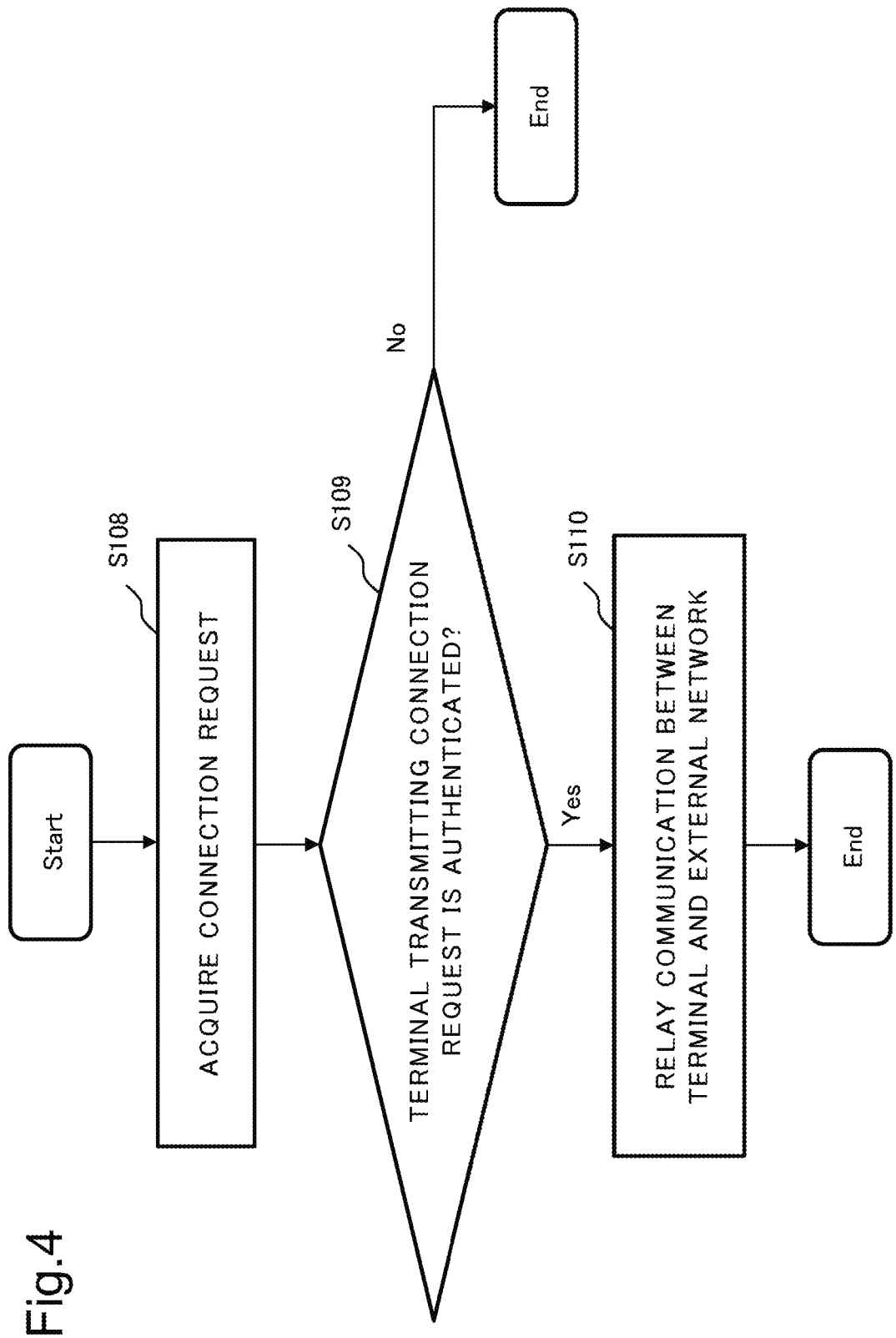
FIG. 4 is a flowchart illustrating an operation example of the calculation system according to the first example embodiment of the present invention.

With reference to FIG. 1, FIG. 2, FIG. 3, and FIG. 4, a calculation system 1 according to a first example embodiment is described. FIG. 1 is a block diagram illustrating a configuration example of the calculation system 1. FIG. 2, FIG. 3, and FIG. 4 are flowcharts illustrating an operation example of the calculation system 1.

The configuration of the calculation system 1 is described. The calculation system 1 includes terminals 10A, 10B, and 10C, calculation devices 20A and 20B, and a setting means 30. The calculation devices 20A and 20B are provided to evacuation shelters A and B, respectively. Note that, in the following description, when the terminals 10A, 10B, and 10C are not distinguished from one another, each of the terminals 10A, 10B, and 10C is referred to as a terminal 10. Further, in the following description, when the calculation devices 20A and 20B are not distinguished from each other, each of the calculation devices 20A and 20B is referred to as a calculation device 20.

The terminal 10 receives a response request from the calculation device 20 (specifically, a communication means 21 to be described later), and responds to the calculation device 20 in response. Specifically, upon receiving the response request, the terminal 10 responds to the response request by transmitting own identification information to the calculation device 20. The identification information is unique information generated from an ID number or a telephone number of a subscriber identity module (SIM) card included in the terminal 10. For example, the terminal 10 is a communication terminal owned by an evacuee.

Further, in response to an instruction from an owner of the terminal 10, the terminal 10 transmits an authentication request containing the own identification information to the calculation device 20. For example, upon arriving at the evacuation shelter A, a user of the terminal 10A instructs the terminal 10A to transmit the authentication request to the calculation device 20A.

The calculation device 20 includes a communication means 21, an acquisition means 22, an authentication means 23, and a calculation means 24. The calculation device 20 is, for example, a server disposed in each evacuation shelter by a local government or the like.

The communication means 21 transmits the response request to the terminal 10 in an evacuation shelter. For example, the communication means 21 transmits a radio signal superimposed with the response request via an antenna oriented to the evacuation shelter. In this case, intensity of the radio signal is set according to an area of the evacuation shelter, and thus only the terminal 10 in the evacuation shelter receives the response request from the communication means 21. For example, the communication means 21 transmits the response request in a predetermined cycle or at a timing that is set in advance. Further, the communication means 21 receives, from the terminal 10 responding to the response request, a signal according to an operation by a user of the terminal 10 (the authentication request described above).

For example, the response request transmitted from the communication means 21 of the calculation device 20A is received by the terminal 10A in the evacuation shelter A, but is not received by the terminal 10B and the terminal 10C outside of the evacuation shelter A. Further, for example, the response request transmitted from the communication means 21 of the calculation device 20B is received by the terminal 10B in the evacuation shelter B, but is not received by the terminal 10A and the terminal 10C outside of the evacuation shelter B.

The communication means 21 is capable of communicating with the terminal 10 and the setting means 30. The communication means 21 receives and transfers, to the acquisition means 22, a response containing the identification information from the terminal 10 receiving the response request. Further, the communication means 21 receives and outputs, to the authentication means 23, the authentication request from the terminal 10.

The acquisition means 22 acquires the identification information relating to the terminal 10. As described above, when receiving the response request from the communication means 21, the terminal 10 transmits the own identification information. At this occasion, the acquisition means 22 acquires the identification information transmitted from the terminal 10, via the communication means 21. The acquisition means 22 stores the acquired identification information in a memory, which is not illustrated. Here, the number of the terminals 10 whose identification information is stored is calculated as the number of evacuee candidates described later.

Further, when the terminal 10 whose identification information is stored in the memory described above does not respond to the response request, the acquisition means 22 deletes the identification information relating to the terminal 10. For example, when the terminal 10A in the evacuation shelter A moves outside the evacuation shelter, the terminal 10A cannot receive the response request from the communication means 21, and hence cannot respond to the response request. In this case, the acquisition means 22 deletes the identification information relating to the terminal 10A from the memory. For example, when the identification information that is already stored is not received from a predetermined time period, the communication means 21 determines that a response to the response request is not present.

When the terminal 10 transmits the authentication request, the authentication means 23 determines whether to authenticate the terminal 10, based on whether the terminal 10 responds to the response request described above. When the terminal 10 responding to the response request transmits the authentication request, the authentication means 23 authenticates the terminal 10. In contrast, when the terminal 10 that does not respond to the response request transmits the authentication request, the authentication means 23 does not authenticate the terminal 10. Here, the calculation means 24, which is described later, calculates, as the number of evacuees, which is described later, the number of the terminals 10 authenticated by the authentication means 23. In this way, the calculation means 24 calculates, as the number of evacuees, the number of the terminals 10 that responds to the response request and transmits the signal (the authentication request) according to an operation by a user.

The authentication means 23 determines whether the terminal 10 transmitting the authentication request is the terminal 10 responding to the response request, based on whether the identification information contained in the authentication request matches with the identification information stored by the acquisition means 22. For example, upon receiving the authentication request from the terminal 10A, the authentication means 23 extracts the identification information contained in the authentication request. The identification information relating to the terminal 10A is already stored in the memory by the acquisition means 22, and hence the authentication means 23 determines that the terminal 10A is the terminal 10 responding to the response request. Further, upon receiving the authentication request from the terminal 10C, the authentication means 23 extracts the identification information contained in the authentication request. The identification information relating to the terminal 10C is not stored by the acquisition means 22, and hence the authentication means 23 determines that the terminal 10C is not the terminal 10 responding to the response request.

Further, when the acquisition means 22 deletes the identification information relating to the terminal 10 from the memory, the authentication means 23 cancels authentication of the terminal 10. The acquisition means 22 deletes the identification information relating to the terminal 10 that does not respond to the response request. In response to this, as described above, the authentication means 23 cancels authentication of the terminal 10, and thus the terminal 10 to be authenticated is limited to the terminal 10 located in the evacuation shelter. In this way, the authentication means 23 cancels authentication of the terminal 10 that does not respond to the response request. With this, the calculation means 24 calculates the number of evacuees while excluding the terminal that does not respond to the response request.

The calculation means 24 calculates, as the number of evacuee candidates, the number of the terminals 10 responding to the response request. Specifically, the calculation means 24 calculates, as the number of evacuee candidates, the number of pieces of the identification information stored in the memory by the acquisition means 22. The identification information stored in the memory by the acquisition means 22 is limited to the identification information relating to the terminal 10 located in the evacuation shelter. With this, the number of pieces of the identification information matches with the number of terminals 10 located in the evacuation shelter, and hence the calculation means 24 is capable of calculating the number of pieces of the identification information stored in the memory by the acquisition means 22, as the number of evacuee candidates. Here, the evacuee candidates include not only an actual evacuee but also an official of the local government and the like in the evacuation shelter.

The calculation means 24 calculates, as the number of evacuees in the evacuation shelter, the number of the terminals 10 authenticated by the authentication means 23. When the identification information contained in the authentication request matches with the identification information stored in the memory by the acquisition means 22, the authentication means 23 authenticates the terminal 10 transmitting the authentication request. In other words, the terminal 10 authenticated by the authentication means 23 is limited to the terminal 10 that is located in the evacuation shelter and also transmits the authentication request. Here, for example, when it is announced that, in the evacuation shelter, only an evacuee is requested to transmit the authentication request, and it is announced that a person other than an evacuee (for example, an official of the local government) is requested not to transmit the authentication request, the terminal authenticated by the authentication means 23 is limited to the terminal owned by an evacuee. Thus, the calculation means 24 is capable of calculating the number of the terminals 10 authenticated by the authentication means 23, as the number of evacuees in the evacuation shelter.

Further, the calculation means 24 transmits the number of evacuee candidates and the number of evacuees to an external communication device via the communication means 21.

Further, the communication means 21 described above has a function as a general base station. Specifically, the communication means 21 relays communication between the terminal 10 and an external network. Here, upon receiving a request for connection to the external network from the terminal 10 authenticated by the authentication means, the communication means 21 relays communication between the terminal 10 and the external network. With this, an evacuee in the evacuation shelter can access to the external network from the terminal 10 authenticated by the authentication means 23, via the communication means 21.

The setting means 30 sets a quantity of supplies that is allotted to the evacuation shelter, based on the number of evacuees notified from the plurality of calculation devices 20. For example, the setting means 30 stores a total number of supplies such as water and blankets in advance. Further, the calculation means 24 in the calculation device 20A provided to the evacuation shelter A notifies the setting means 30 via the communication means 21 that the number of evacuees is, for example, 100. Further, the calculation means 24 in the calculation device 20B provided to the evacuation shelter B notifies the setting means 30 via the communication means 21 that the number of evacuees is, for example, 200. In this case, the setting means 30 allots the supplies to the evacuation shelter A and the evacuation shelter B at a ratio of 1:2. The setting means 30 provides the allotment result (for example, the number of blankets allotted to the evacuation shelter A, or the like) to an official of the local government, on a display screen or through a speaker. The setting means 30 enables an official of the local government to deliver an appropriate number of supplies to the evacuation shelter without requiring the official of the local government to calculate the number of supplies to be delivered to the evacuation shelter.

The above-mentioned number of evacuees includes a user of the terminal 10 that responds to the response request and also transmits the authentication request. However, in actuality, a user who is an evacuee but forgets to transmit the authentication request is not counted as an evacuee in the calculation system 1. The number of evacuees notified from the calculation device 20 is less than an actual number of evacuees because of such a user, and hence the supplies may be in short at each of the evacuation shelters when the supplies are allotted based on the number of evacuees. In view of this, the setting means 30 may set a quantity of supplies to be allotted to the evacuation shelter, based on the number of evacuee candidates. The number of evacuee candidates includes a user of the terminal 10 that responds to the response request but does not transmit the authentication request. Thus, a user who forgets to transmit the authentication request is also counted as an evacuee. Therefore, in a case in which the supplies are allotted based on the number of evacuee candidates, even when there is a user who forgets to transmit the authentication request, an appropriate quantity of supplies can be delivered to the evacuation shelter.

A user who operates the setting means 30 selects whether the setting means 30 allots supplies according to the number of evacuees or the number of evacuee candidates.

Next, with reference to FIG. 2, FIG. 3, and FIG. 4, an operation of the calculation system 1 is described. FIG. 2 is a flowchart illustrating the operation of the calculation system 1 when acquiring the number of evacuee candidates. FIG. 3 is a flowchart illustrating the operation of the calculation system 1 when acquiring the number of evacuees. FIG. 4 is a flowchart illustrating the operation of the calculation system 1 when relaying communication between the terminal 10 and the external network.

As illustrated in FIG. 2, the communication means 21 transmits a response request to the terminal 10 in an evacuation shelter (S101). For example, the communication means 21 of the calculation device 20A transmits a response request to the terminal 10A. Further, the communication means 21 of the calculation device 20B transmits a response request to the terminal 10B. The response request contains a message for requiring an evacuee to transmit an authentication request. At this occasion, the terminal 10 that receives the response request transmits own identification information to the communication means 21, and thus responds to the response request.

The communication means 21 determines whether there is a response to the transmitted response request (S102).

When there is no response to the response request (No in S102), the calculation system 1 terminates the operation.

When there is a response to the response request (Yes in S102), the acquisition means 22 stores the identification information relating to the terminal 10 (S103). For example, the acquisition means 22 of the calculation device 20A stores identification information relating to the terminal 10A. Further, for example, the acquisition means 22 of the calculation device 20B stores identification information relating to the terminal 10B.

The calculation means 24 adds the number of pieces of the identification information stored by the acquisition means 22, to the number of evacuee candidates (S104). In this way, the calculation system 1 calculates, as the number of evacuee candidates, the number of the terminals responding to the response request.

Further, with reference to FIG. 3, the operation of the calculation system 1 is described. At the point of starting the operation in FIG. 3, it is assumed that, upon receiving the response request in the processing in S101, the terminal 10 displays for a user the message contained in the response request, the message requiring an evacuee to transmit an authentication request. Further, when a user who checks the message is an evacuee, it is assumed that the user operates the terminal 10 in such a way as to transmit the authentication request.

The authentication means 23 acquires, from the terminal 10, the authentication request containing the identification information (S105). With this, for example, the acquisition means 22 of the calculation device 20A acquires an authentication request from the terminal 10A. Further, the acquisition means 22 of the calculation device 20B acquires an authentication request from the terminal 10B.

The authentication means 23 determines whether the identification information contained in the authentication request matches with the identification information stored by the acquisition means 22 (S106). For example, the authentication means 23 of the calculation device 20A determines that the authentication request acquired from the terminal 10A contains identification information that matches with the identification information stored by the acquisition means 22. Further, the authentication means 23 of the calculation device 20B determines that the authentication request acquired from the terminal 10B contains identification information that matches with the identification information stored by the acquisition means 22. At this occasion, the authentication means 23 transmits, to the authenticated terminal 10, a message for requiring transmission of a connection request when connection to an external network is required.

When it is determined that the identification information contained in the authentication request does not match with the identification information stored by the acquisition means 22 (No in S106), the calculation system 1 terminates the operation.

When it is determined that the identification information contained in the authentication request matches with the identification information stored by the acquisition means 22 (Yes in S106), the calculation means 24 adds the number of the terminals 10 authenticated by the authentication means 23 to the number of evacuees(S107). In this way, in the calculation system 1, the number of the terminals 10 that responds to the response request and then transmits the authentication request is calculated as the number of evacuees.

Further, with reference to FIG. 4, the operation of the calculation system 1 is described. At a point of starting the operation in FIG. 4, it is assumed that, in the processing in S106, the authentication means 23 transmits, to the authenticated terminal 10, the message for requiring transmission of the connection request when connection to the external network is required, as described above. With this, it is assumed that the authenticated terminal 10 displays the message. Further, it is assumed that a user who checks the message operates the terminal 10 in such a way as to transmit the connection request.

The communication means 21 acquires, from the terminal 10, the connection request containing the identification information relating to the terminal 10 (S108). With this, for example, the acquisition means 22 of the calculation device 20A acquires a connection request from the terminal 10A. Further, the acquisition means 22 of the calculation device 20B acquires a connection request from the terminal 10B.

The communication means 21 determines whether the terminal 10 transmitting the connection request is authenticated by the authentication means 23 (S109). For example, the communication means 21 of the calculation device 20A determines that the terminal 10A is authenticated by the authentication means. Further, the communication means 21 of the calculation device 20B determines that the terminal 10B is authenticated by the authentication means 23.

When the terminal 10 transmitting the connection request is not authenticated by the authentication means 23 (No in S109), the calculation system 1 terminates the operation.

When the terminal 10 transmitting the connection request is authenticated by the authentication means 23 (Yes in S109), the communication means 21 relays communication between the terminal 10 and the external network (S110). For example, the communication means 21 of the calculation device 20A relays communication between the terminal 10A and the external network. Further, for example, the communication means 21 of the calculation device 20B relays communication between the terminal 10B and the external network (S110).

In each of the operation examples described above, the calculation means 24 displays the calculated number of evacuee candidates and the calculated number of evacuees on a display screen or the like, or transmits the calculated numbers to an external device (for example, the setting means 30). Further, each time the processing in S104 is completed, the calculation means 24 may transmit the number of evacuee candidates to an external device. Each time the processing in S107 is completed, the calculation means 24 may transmit the number of evacuees to an external device.

As described above, the calculation system 1 includes the communication means 21 and the calculation means 24. The communication means 21 transmits the response request to the terminal in the evacuation shelter, and receives, from the terminal responding to the response request, the signal (the authentication request) according to an operation by a user of the terminal. The calculation means 24 calculates, as the number of evacuees in the evacuation shelter, the number of the terminals transmitting the signal (the authentication request).

For example, as described in PTL 1, when a position associated to position information relating to a terminal is within an area of an evacuation shelter, a user of the terminal is regarded as an evacuee in the evacuation shelter. In this case, not only the terminal of the evacuee but also a terminal of an official of a local government or a volunteer staff is regarded as a terminal of an evacuee, and thus the local government cannot accurately know the number of evacuees.

However, the calculation system 1 calculates, as the number of evacuees in the evacuation shelter, the number of the terminals that responds to the response request and transmits the signal (the authentication request) according to an operation by a user. Through use of this, for example, when it is announced that, in the evacuation shelter, only an evacuee is required to transmit the signal (the authentication request), and it is announced that a person other than an evacuee (for example, an official of the local government) is required not to transmit the signal (the authentication request), the calculation means 24 is capable of calculating the number of evacuees while excluding a person other than an evacuee.

Second Example Embodiment

Figure 5:
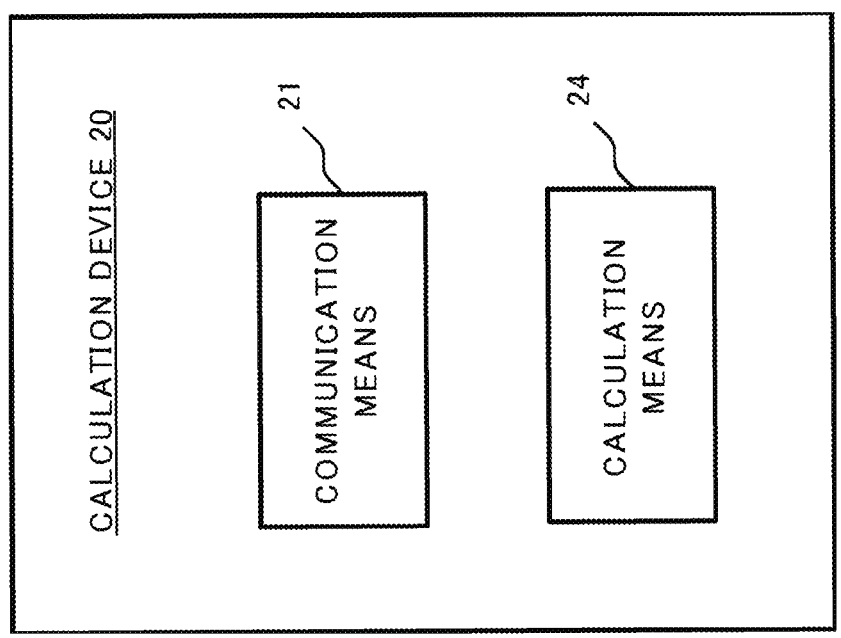
FIG. 5 is a block diagram illustrating a configuration example of a calculation device according to a second example embodiment of the present invention.
Figure 6:
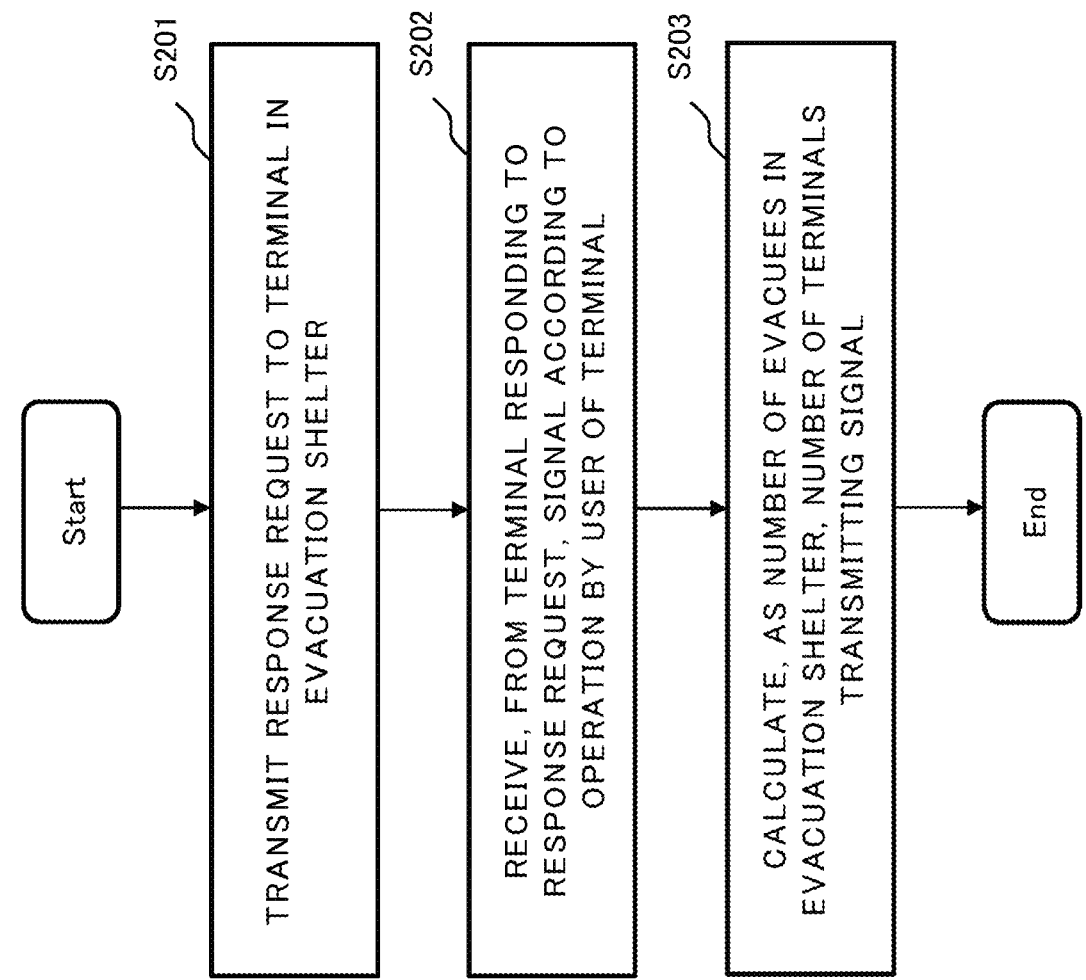
FIG. 6 is a flowchart illustrating an operation example of the calculation device according to the second example embodiment of the present invention.

With reference FIG. 5 and FIG. 6, a calculation device 20 according to a second example embodiment is described. As illustrated in FIG. 5, the calculation device 20 includes a communication means 21 and a calculation means 24. The calculation device 20 is provided in, for example, an evacuation shelter run by a local government or the like.

The communication means 21 transmits a response request to a terminal in the evacuation shelter. Further, the communication means 21 receives, from the terminal responding to the response request, a signal (an authentication request) according to an operation by a user of the terminal.

The calculation means 24 calculates, as the number of evacuees in the evacuation shelter, the number of the terminals that transmits the signal (the authentication request).

Next, with reference to FIG. 6, an operation of the calculation device 20 is described. FIG. 6 is a flowchart illustrating the operation of the calculation device 20.

The communication means 21 transmits a response request to a terminal in an evacuation shelter (S201). With this, the terminal responds to the response request.

The authentication means 23 receives, from the terminal responding to the response request, a signal (an authentication request) according to an operation by a user of the terminal (S202).

The calculation means 24 calculates, as the number of evacuees in the evacuation shelter, the number of the terminals transmitting the signal (S203).

As described above, the calculation device 20 includes the communication means 21 and the calculation means 24. The communication means 21 transmits the response request to the terminal in the evacuation shelter, and receives, from the terminal responding to the response request, the signal according to an operation by a user of the terminal. The calculation means 24 calculates, as the number of evacuees in the evacuation shelter, the number of the terminals transmitting the signal.

For example, as described in PTL 1, when a position associated to position information relating to the terminal is within an area of the evacuation shelter, a user of the terminal is regarded as an evacuee in the evacuation shelter. In this case, not only the terminal of the evacuee but also a terminal of an official of the local government or a volunteer staff is regarded as a terminal of an evacuee, thus the local government cannot accurately know the number of evacuees.

However, the calculation device 20 calculates, as the number of evacuees in the evacuation shelter, the number of the terminals that responds to the response request and transmits the signal according to an operation by a user. Through use of this, for example, when it is announced that, in the evacuation shelter, only an evacuee is required to transmit the signal, and it is announced that a person other than an evacuee (for example, an official of the local government) is required not to transmit the signal, the calculation means 24 is capable of calculating the number of evacuees while excluding a person other than an evacuee.

Figure 7:
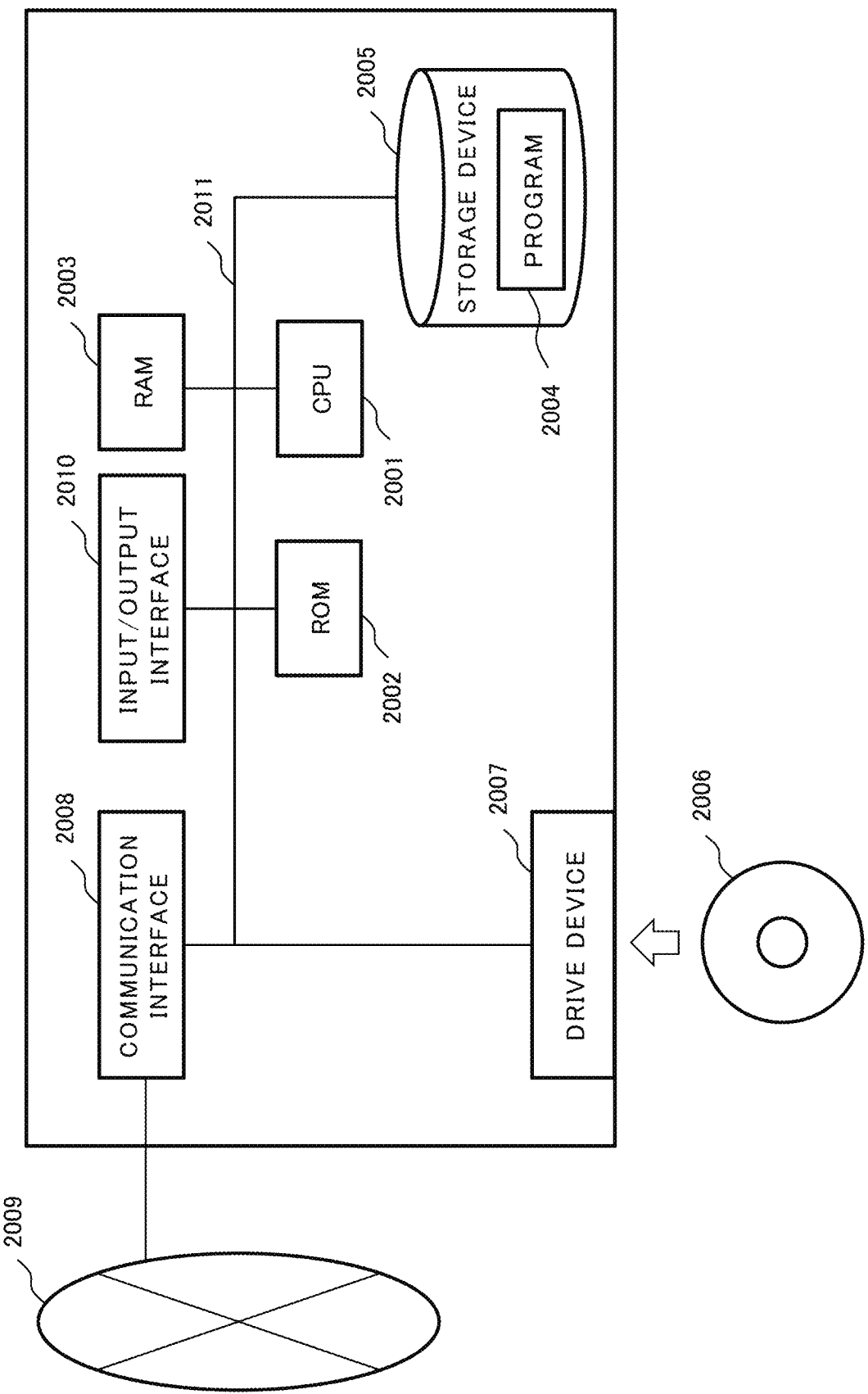
FIG. 7 is a diagram illustrating an example of an information processing device that achieves the calculation device and the like according to the first and second example embodiments of the present invention.

Further, some or all of the components of each of the devices or the system is achieved by any combination of an information processing device 2000 and a program, as illustrated in FIG. 7, for example. FIG. 7 is a diagram illustrating an example of an information processing device that achieves the calculation system 1. As an example, the information processing device 2000 includes the following configuration.

A central processing unit (CPU) 2001
A read only memory (ROM) 2002
A random access memory (RAM) 2003
A program 2004 loaded on the RAM 2003
A storage device 2005 that stores the program 2004
A drive device 2007 that performs writing and reading of a recording medium 2006
A communication interface 2008 that is connected to a communication network 2009
An input/output interface 2010 that inputs and outputs data
A bus 2011 that connects each component Each of the components of each of the devices in each of the example embodiments is achieved by the CPU 2001 acquiring and executing the program 2004 for achieving those functions. For example, the program 2004 for achieving the functions of the components of the devices is stored in the storage device 2005 or the RAM 2003 in advance, and is read out by the CPU 2001, as required. The program 2004 may be supplied to the CPU 2001 via the communication network 2009, or may be stored in advance in the recording medium 2006, and may be supplied to the CPU 2001 by the drive device 2007 reading out the program.

Various modification examples are given as a method of achieving each of the devices. For example, each of the devices may be achieved by any combinations of a program and the information processing device 2000, each of which is separately provided for each of the components. Further, a plurality of components included in each of the devices may be achieved by any one combination of a program and the information processing device 2000.

Further, a part or an entirety of each of the components of each of the devices is achieved by a general or dedicated circuitry including a processor or the like, or by a combination thereof. These may be configured by a single chip or a plurality of chips connected to each other via a bus. A part or an entirety of each of the components of each of the devices may be achieved by a combination of the circuit or the like described above and a program.

When a part or an entirety of each of the components of each of the devices is achieved by a plurality of information processing devices, circuits, and the like, the plurality of information processing devices, the circuits, and the like may be arranged in a centralized way, or may be arranged in a distributed way. For example, the information processing devices, the circuits, and the like may be achieved in a form in which each of the information processing devices, the circuits, and the like is connected via a communication network, such as a client-and-server system, a cloud computing system, and the like.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2020-161647, filed on Sep. 28, 2020, the disclosure of which is incorporated herein in its entirety by reference.

REFERENCE SIGNS LIST

1 Calculation system
10, 10A, 10B, 10C Terminal
20, 20A, 20B Calculation device
21 Communication means
22 Acquisition means
23 Authentication means
24 Calculation means
30 Setting means

What is claimed is:

1. A calculation device comprising:
a communicator configured to transmit a response request to a terminal in an evacuation shelter and receive, from the terminal responding to the response request, a signal according to an operation by a user of the terminal; and
a calculator configured to calculate, as a number of evacuees in the evacuation shelter, a number of the terminals transmitting the signal,
wherein the communicator transmits the response request a plurality of times, and
wherein, when the terminal transmitting the signal does not respond to the response request, the calculator calculates a number of evacuees without including the terminal in the number of evacuees.

2. The calculation device according to claim 1 wherein the communicator receives, from the terminal transmitting the signal, a request for connection to an external network, and relays communication between the terminal and the external network.

3. The calculation device according to claim 1, wherein the calculator calculates, as a number of evacuee candidates, a number of the terminals responding to the response request.

4. A calculation system comprising:
a setter; and
a plurality of the calculation devices according to claim 3, wherein,
in each of the calculation devices,
the communicator transmits the response request to the terminal in the evacuation shelter, the terminal being different for each of the calculation devices, and
the calculator calculates, as the number of evacuee candidates for the evacuation shelter, a number of the terminals responding to the response request, and outputs the number of evacuee candidates to the setter, and
the setter sets a quantity of supplies to be allotted to the evacuation shelter, according to the number of evacuee candidates being output from the calculator.

5. A calculation system comprising:
a setter; and
a plurality of the calculation devices according to claim 3, wherein
in each of the calculation devices,
the communicator transmits the response request to the terminal in the evacuation shelter, the terminal being different for each of the calculation devices, and receives a signal, from the terminal responding to the response request, a signal according to an operation by a user of the terminal, and
the calculator calculates, as the number of evacuees for the evacuation shelter, a number of the terminals transmitting the signal, and outputs the number of evacuees to the setter, and
the setter sets a quantity of supplies to be allotted to the evacuation shelter, according to the number of evacuees being output from the calculator.

6. A calculation method comprising:
transmitting a response request a plurality of times to a terminal in an evacuation shelter;
receiving, from the terminal responding to the response request, a signal according to an operation by a user of the terminal; and
calculating, as a number of evacuees in the evacuation shelter, a number of the terminals transmitting the signal,
wherein, when the terminal transmitting the signal does not respond to the response request, a number of evacuees is calculated without including the terminal in the number of evacuees.

7. A non-transitory storage medium storing a program causing an information processing device to execute:
processing of transmitting a response request a plurality of times to a terminal in an evacuation shelter;
processing of receiving, from the terminal responding to the response request, a signal according to an operation by a user of the terminal; and
processing of calculating, as a number of evacuees in the evacuation shelter, a number of the terminals transmitting the signal,
wherein, when the terminal transmitting the signal does not respond to the response request, a number of evacuees is calculated without including the terminal in the number of evacuees.

8. The calculation device according to claim 1, wherein the communicator receives, from the terminal transmitting the signal, a request for connection to an external network, and relays communication between the terminal and the external network.

9. The calculation device according to claim 1, wherein the calculator calculates, as a number of evacuee candidates, a number of the terminals responding to the response request.

10. The calculation device according to claim 2, wherein the calculator calculates, as a number of evacuee candidates, a number of the terminals responding to the response request.

* * * * *